Patented Jan. 15, 1929.

1,699,245

UNITED STATES PATENT OFFICE.

MARTIN LUTHER, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF CONDENSATION PRODUCTS OF METHYLOL COMPOUNDS OF A UREA.

No Drawing. Application filed March 2, 1927, Serial No. 172,194, and in Germany February 27, 1926.

It has been shown elsewhere that condensation products of urea and formaldehyde can be obtained by condensing dimethylol-urea (melting point 121° C.), or the higher-molecular amorphous products resulting therefrom by spitting off water by means of alkaline condensing agents (see Chemiker Zeitung 1897, p. 460), in orangic solvents with the aid of acid condensing agents. By the said process lacquers and solid glass-like products possessing great hardness, which products have the properties of colloids, can be produced.

We have now found that new condensation products can be obtained from methylol compounds of urea, that is to say condensation products obtainable from urea (including its homologues and derivatives such as thio-urea, N-methyl-urea, N-methyl-thio-urea and the like) and formaldehyde by the action of alkaline condensing agents, such as methylol-urea, dimethylol-urea or the higher molecular amorphous products resulting therefrom by splitting off water (all of which initial materials are to be regarded as equivalents for the purpose of the present invention). According to our present invention the said initial materials are subjetced to condensation in alcohols either alone or in mixture with other solvents such as hydrocarbons, ethers, esters and the like, with the aid of acid condensing agents under mild conditions of working, that means while employing smaller quantities of acid condensing agents than are employed in the production of the high-molecular colloidal products referred to above, and heating the reaction mixture only until all of the dimethylol-urea or other initial material is dissolved, the condensation being then at once stopped by neutralizing the acid condensing agent by adding alkaline substances, so that no colloidal products of high molecular weight of the kind suitable for lacquers are formed. Preferably only weakly acid condensing agents such as alcoholic hydrochloric acid, formic acid, acetic acid, sulfuric acid, mono-methyl ester and the like are employed in this reaction.

The new compounds crystallize from the reaction mixture on cooling. They are readily soluble in most organic solvents, especially those employed for the manufacture of lacquers such as aliphatic or aromatic alcohols, for example, iso-butylalcohol, hexyl-alcohol or polyvalent alcohols, their ethers and esters, for instance glycol and glycerol, or phenols and the like.

The said new crystalline products can be subjected to further condensation for example by treating them with acid condensing agents under stronger conditions than those employed for their production, in the absence or presence of organic solvents and with or without the aid of pressure and it is important that in this manner lacquers or glass-like products, i. e. high molecular colloidal products are formed, which are completely free from water, owing to the fact that in the said reaction no water is split off as is the case in the condensation of dimethylol-urea or of urea and formaldehyde.

The new crystalline products may also be converted into lacquers or glass-like colloidal products by subjecting them to a prolonged treatment at higher temperatures in the absence of condensing agents. In this case the operation must be carried out in a closed vessel under pressure, when alcohols or other solvents of low boiling point are employed. The aid of condensing agents may also be dispensed with when the reaction mixture contains phenols or colophony.

Another very advantageous method of converting the new crystalline products into glass-like masses consists in condensing them in the fused state, which treatment cannot be effected in the case of dimethylol-urea.

The further condensation may be carried out in the presence of various other materials such for example as plasticizers, natural and artificial resins, cellulose esters and the like, or the solutions of the products may be mixed with other lacquers or solvents before or after further condensation.

When a mixture of the colloidal condensation products thus obtained is mixed with materials containing protein such as casein, yeast and the like, and the mixture is pressed at temperatures between about 90° and 110° C., readily workable artificial masses of high stability against water and high electric insulating power are obtained.

The following examples will further illustrate how our present invention may be carried into practical effect, but the invention is not limited to these examples. The parts are by weight.

*Example 1.*

Dry dimethylol-urea obtained by condensing urea and formaldehyde in the presence of alkali is suspended in its own weight of methanol. About 0.5 per cent of the quantity of dimethylol-urea of normal methyl alcoholic hydrochloric acid is then added while stirring and the mixture heated to boiling. After boiling for 5 to 10 minutes the product is neutralized and filtered, while hot. On cooling, the new condensation product separates in the form of colourless needles which, when recrystallized from methanol or ethyl alcohol, melt at 100° to 102° C. The new product is soluble in alcohols and esters and very readily soluble in water.

*Example 2.*

Dimethylol-urea is suspended in the same amount, by weight, of ethyl alcohol of 96 per cent strength. 0.5 per cent of the quantity of dimethylol-urea of normal alcoholic hydrochloric acid is added while stirring and the mixture boiled for 5 to 10 minutes. On cooling the mixture, colorless soft leaflets separate which can readily be recrystallized from methanol or ethyl alcohol and melt at 124 to 126° C.

The condensation may also be carried out in a closed vessel under elevated pressure.

*Example 3.*

148 parts of the product melting at 100° to 102° C. described in Example 1 are dissolved in 175 parts of anhydrous methanol, mixed with about 5 parts of primary sodium phosphate and heated for about half an hour in a closed vessel to more than 80° C. The resulting product is neutralized by means of a little calcium oxid and then filtered or centrifuged. A lacquer solution containing 35 to 40 per cent of the condensation product is obtained. The sodium phosphate may also be employed in smaller quantities or entirely dispensed with.

*Example 4.*

120 parts of dimethylol-urea are suspended in 100 parts of methanol and 20 parts of benzene and heated to boiling with an addition of 2 to 3 parts of formic acid or glacial acetic acid. After a short time all of the dimethylol-urea is dissolved. The solution is neutralized by means of methyl alcoholic caustic potash solution and filtered. On cooling, the condensation product having a melting point of 100° to 102° C. is separated.

*Example 5.*

90 parts of mono-methylol-urea are suspended in 100 parts of methanol and boiled for a short time with 2 parts of sulfuric acid mono-methyl ester. After neutralization with methyl alcoholic caustic potash solution, the solution is filtered. On cooling, the condensation product crystallizes in the form of lozenge-shaped leaflets melting at 91° to 92.5° C.

*Example 6.*

120 parts of the crystalline product obtained according to Example 4 are suspended in 100 parts of isobutyl alcohol and heated for a short time to 150° to 160° C. in an autoclave while stirring. A clear lacquer is obtained which does not separate water even on prolonged standing. If desired, about 10 to 15 parts of phenol may be added to the mixture before heating.

What we claim is:

1. As new articles of manufacture, crystalline condensation products of methylol compounds of a urea, which are readily soluble in the usual solvents for lacquers and which are obtainable by condensing a methylol compound of urea in an alcohol with the aid of acid condensing agents under mild conditions the condensation being stopped instantly after all of the initial material is dissolved and cooling the reaction mixture.

2. The process of producing crystalline condensation products of methylol compounds of a urea which comprises condensing a methylol compound of urea in an alcohol with the aid of an acid condensing agent under mild conditions, the condensation being stopped instantly after all of the initial material is dissolved.

3. The process of producing crystalline condensation products of methylol compounds of a urea which comprises condensing a methylol compound of urea in an alcohol in mixture with another solvent with the aid of an acid condensing agent under mild conditions, the condensation being stopped instantly after all of the initial material is dissolved.

4. The process of producing crystalline condensation products of methylol compounds of a urea which comprises condensing dimethylol-urea in an alcohol with the aid of an acid condensing agent, stopping the condensation instantly after all of the initial material is dissolved.

5. The process of producing crystalline condensation products of methylol compounds of a urea which comprises condensing dimethylol-urea in an alcohol with the aid of a weak acid condensing agent under mild conditions the condensation being stopped instantly after all of the initial material is dissolved.

6. The process of producing condensation products of methylol compounds of a urea which comprises first condensing a methylol compound of urea in an alcohol with the aid of an acid condensing agent, the condensation being stopped instantly after all of the initial material is dissolved, and subjecting the resulting crystalline condensation product to further condensation.

In testimony whereof we have hereunto set our hands.

MARTIN LUTHER.
CLAUS HEUCK.